Feb. 27, 1968          G. STAVIS          3,371,341
METHOD AND MEANS FOR EXTRACTING VELOCITY SENSE FROM
A NON-COHERENT JANUS DOPPLER RADAR SYSTEM
Filed May 1, 1967          2 Sheets-Sheet 1

United States Patent Office 3,371,341
Patented Feb. 27, 1968

3,371,341
METHOD AND MEANS FOR EXTRACTING VELOCITY SENSE FROM A NON-COHERENT JANUS DOPPLER RADAR SYSTEM
Gus Stavis, Briarcliff Manor, N.Y., assignor to General Precision Systems Inc., a corporation of Delaware
Filed May 1, 1967, Ser. No. 637,615
8 Claims. (Cl. 343—9)

ABSTRACT OF THE DISCLOSURE

Method and means for deriving the sense of the velocity vector in Janus-type navigational radars. Two separate signals are derived from the antenna as though there had been two receiving systems mutually displaced along the line of travel by a distance equivalent to an eighth of a wavelength or $\pi/4$ radians in phase. Final detection of these signals yields a two phase voltage pair in quadrature whose phase rotation sense varies in relation to the sign of the quantity $(\nu_f - \nu_a)$; where $\nu_f$ is the Doppler shift from the forward looking beam and $\nu_a$ the Doppler shift from the rearward looking beam. Means are provided for introducing an offset reference frequency $\rho$ so that when motion is forward, the frequency of the receiver output voltage is equal to $\rho + (\nu_f - \nu_a)$ and when motion is backward, this frequency is equal to $\rho - (\nu_f - \nu_a)$. The receiver output voltage is then processed in a SINE-COSINE frequency tracker which includes a subtracting circuit to produce positive velocity digital information on one output line and negative velocity digital information on another line.

Brief summary of the invention

It is well-known that the principal reason Doppler radars are pulsed is to avoid the troublesome effects which occur in continuous wave systems when portions of the transmitted signal reach the receiver through devious leakage paths.

In so-called pulsed coherent systems, the output of a reference continuous wave oscillator is amplified by a suitably gated power amplifier tube, the output of which is transmitted. The echo returning at all times, save during pulse transmission, is mixed with a signal from the reference oscillator and the sum is detected. Such a system may be thought of as a sampled continuous wave system and since the only source of phase change between the mixed signals is due to the Doppler shift of the echo, requisite coherence is obtained.

Now consider pulsed transmission which is incoherent, that is, suppose succeeding pulses are emitted with random phase, such as normally is the case with a magnetron. In this situation, requisite coherence for receiving of Doppler information may be achieved by mixing two echoes derived from the same transmitted pulse.

As is well-known systems employing the latter technique are called pulsed non-coherent Janus systems or simply Janus systems for short.

Typically, in such systems, one RF channel simultaneously feeds a beam directed ahead and to the right of ground track and one aft and to the left while a fore-left and an aft-right pair are fed by a second channel; the two channels being fed either simultaneously using a power divider or on a time shared basis using a switch. The echoes received via the two beams of a given channel are then heterodyned together before final detection. This results in extraction of an audio Doppler signal comprising the direct beat frequency between a fore and an aft beam signal rather than the frequency shifts of the echoes from individual beams. And, since the character of this direct beat signal remains insensitive to a reversal in the direction of the velocity vector, it has heretofore been impossible to derive velocity sense from the demodulated audio Doppler signals provided by non-coherent Janus systems.

Against this background, it is the primary object of the present invention to provide a method and means whereby velocity sense as well as magnitude may be extracted from demodulated Doppler information and in particular from the Doppler information derived in pulsed non-coherent Janus systems.

In brief, the present invention contemplates a scheme which can provide the velocity sense by suitable antenna design and signal processing. The details of the antenna design are not critical so long as two separate signals are derived from each beam pair which signals are related as though there had been two receiving systems mutually displaced along the line of travel by a distance equivalent to $\pi/4$ radians in phase.

Each of these signals may then be detected to produce a mutual quadrature two phases voltage pair with the velocity sense information being contained in the rotation sense of the two phase set. The two signals may then be offset in frequency and processed by a sine-cosine frequency tracker in a conventional way to provide velocity sense as well as magnitude.

Detailed description of the invention

Figure 1:
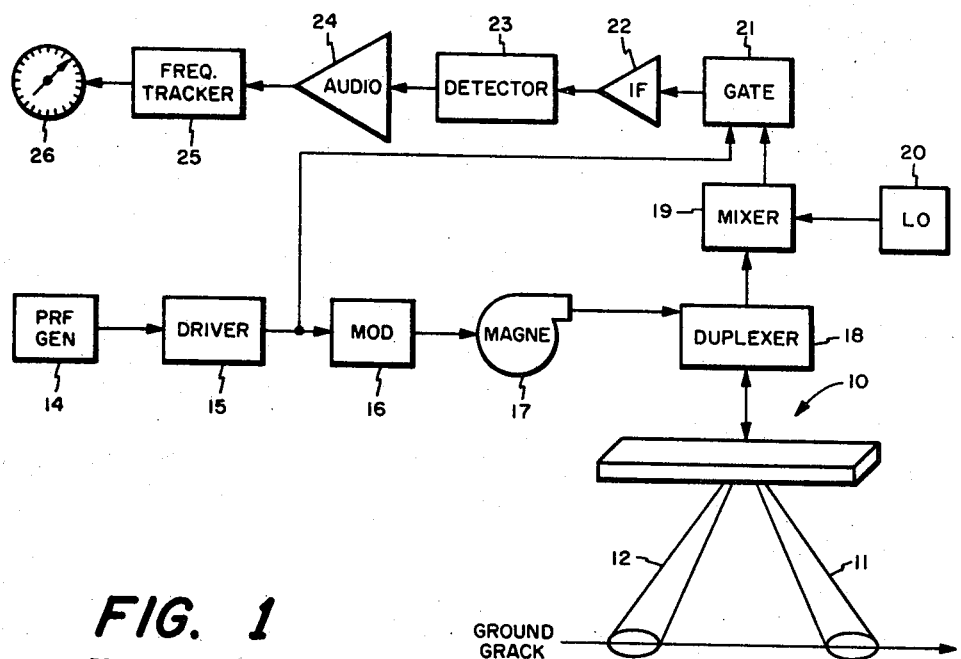
FIG. 1 is a schematic block diagram of a prior art Janus system.

FIG. 1 illustrates in schematic block form a typical prior art pulsed non-coherent Janus system. For convenience, only one channel is represented and will be described. Thus, let it be assumed that the antenna assembly indicated generally by reference character 10 is such as to direct a beam 11 of pulsed microwave energy forward in the direction and plane of ground track and a similarly characterized beam 12 aft as symbolically shown. By way of example, it will be further assumed that the antenna assembly comprises a rectangular linear waveguide array although it will occur to those skilled in the art that other antenna forms may be used as well.

It is fundamental that when a waveguide section is provided with a series of similar isotropic radiators longitudinally spaced at regular distances in one of its faces and the waveguide is coupled to a source of microwave energy at one of its ends it will radiate a conical shell of energy *away* from the feed end at a half angle $\gamma$ relative to its longitudinal axis such that $$\cos \gamma = \frac{\lambda}{\lambda_g} + \frac{N\lambda}{S} \quad (1)$$

where $\lambda$ is the microwave energy wavelength in space, $\lambda_g$ is the microwave energy wavelength in the waveguide, $S$ is the distance between the radiators, and $N$ is any integer including zero designating the order of the principal lobe produced. In an array of this type, commonly referred to as an inphase array, it has been found that, at desired values of $\gamma$, $\lambda$, and $\lambda_g$, a convenient spacing $S$ which can be employed without generating a second principal lobe is a distance producing a phase difference of $$\pi/2 \quad (2)$$

radians between consecutive radiators. Thus, in this particular inphase array the phase progressions at the radiators from the feed end will be $$0, -\frac{\pi}{2}, \pi, \frac{\pi}{2}, 0, \text{etc.} \quad (3)$$

Now consider an inphase array wherein the coupling phase of each alternate radiator is changed by 180°. To illustrate, let it be assumed that the radiators in the above-mentioned array take the form of shunt slots cut into the broad face of a rectangular waveguide, the slots being offset to one side of the latter's longitudinal axis. Now by moving each alternate slot to the other side of the longitudinal axis, the coupling phases of the alternate radiators will be changed by 180°. Accordingly, in the new array, the coupling phases of consecutive radiators will now follow the progression $$0, \frac{\pi}{2}, \pi, -\frac{\pi}{2}, 0, \text{etc.} \quad (4)$$

and the radiation thereof will be given by $$\cos \pi = \frac{\lambda}{\lambda_g} - \frac{\lambda}{2S} \quad (5)$$

where $\gamma$ now defines the half-angle of a conical shell of radiation extending *toward* the feed end of the array. An array of the type defined by Equation 5 is commonly referred to as an antiphase array.

With reference to the theory of superposition, it becomes reasonably evident that the above-mentioned inphase and antiphase arrays may be combined to produce a single array capable of emitting two beams, one beam having inphase attributes and the other having antiphase attributes. When this is done cancellation of the alternate radiators in each array may be considered to occur inasmuch as they will have coupling phases of $\pm \pi/2$, $\mp \pi/2$ radians respectively. Hence, the resulting two beam array might have, again by way of example, a series of shunt slot radiators having a spacing equal to 2S and a coupling phase progression of $$0, \pi, 0, \pi, \text{etc.} \quad (6)$$

Figure 2:
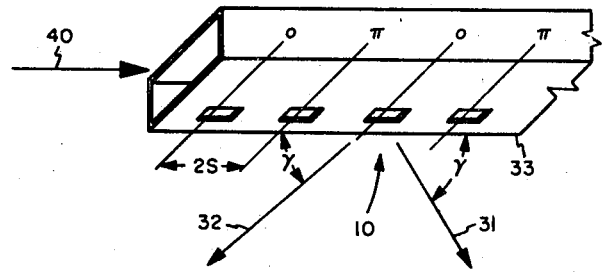
FIG. 2 is a perspective sketch of a dual beam linear array antenna.

The antenna assembly 10 of FIG. 1 being so designed is represented in greater detail in FIG. 2. As shown therein, ray 31 represents the normal component of beam 11 which in turn represents the inphase component radiated by waveguide 33 when the latter is coupled to a suitable source of microwave energy at its left-most end as indicated generally by arrow 40. Likewise, ray 32 represents the normal component of beam 12 which latter comprises the antiphase product simultaneously radiated by the waveguide. As mentioned previously, the radiators in the waveguide are represented in an exemplary fashion as shunt slots in the waveguide's broad face. It will be appreciated, however, that similar results could be obtained if other familiar forms of radiators such as dipoles, horns, edge-cut oblique slots and the like were substituted instead.

Returning now to FIG. 1, a pulse repetition frequency generator 14 is shown feeding amplitude modulator 16 through driver 15. In response to the modulator, magnetron 17 emits a microwave carrier frequency of say, 8.8 gHz. which is in turn pulsed at a rate determined by the output frequency of generator 14; the latter, for example, being in the neighborhood of 50 kHz. The pulsed microwave output signal from magnetron 17 is then applied through duplexer 18 to antenna 10.

Assuming substantial time overlap, the backscattered energy from each beam is received by the antenna and fed through the duplexer to mixer 19. Representing the frequency shift resulting from the familiar Doppler effect by the Greek letter $\nu$, the frequency content of the return energy associated with forward beam 11 is therefore equal to 8.8 gHz.$+\nu_f$ whereas the frequency content of the echo resulting from aft beam 12 may likewise be expressed as 8.8 gHz.$+\nu_a$. Since, all of the while, mixer 19 is being keyed by an 8.8 gHz. signal obtained from local oscillator 20 the mixer provides output signals heterodyned to 30 mHz.$+\nu_f$ and 30 mHz.$+\nu_a$, respectively. These signals are then passed through gate 21 which, by the way, is being clocked by the output of driver 15, and thereafter through IF amplifier 22 for amplification. The output of the amplifier is then coupled to a coherent detector 23, wherein the fore and aft IF signals are directly beat against one another and a spectral signal envelope is extracted having a center frequency equal in magnitude to $\nu_f - \nu_a$ which latter comprises the demodulated audio Doppler information. Subsequently, after further amplification in audio amplifier 24, this signal is fed to a frequency tracker 25 which in response thereto continuously produces an output signal proportional to the magnitude of the antenna's velocity along ground track. The tracker's output signal may therefore be finally applied to a suitable velocity indicating means as represented generally by reference character 26.

It will be recognized, however, in connection with the foregoing process, that because the Doppler information is derived by heterodyning together the echoes from the fore and aft beams, the spectral frequency distribution contained in the tracker's input signal and corresponding to a given velocity magnitude, will appear to be the same regardless of whether the velocity vector is in the direction of or opposite to ground track. For this reason, the prior art non-coherent Janus Doppler described immediately above is incapable of providing velocity sense information.

Thus in accordance with the principles of the present invention, it is proposed to modify the prior art Janus system of FIGS. 1 and 2 as schematically shown in FIGS. 3 through 7.

Figure 3:
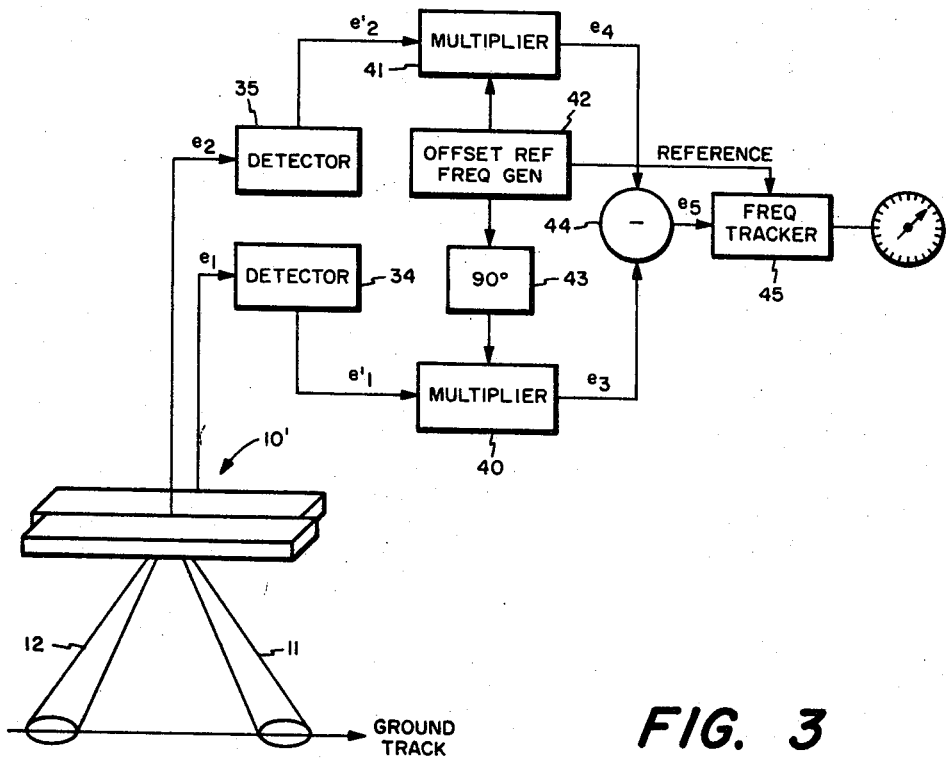
FIG. 3 is a schematic block diagram of the receiver according to the present invention.

In the preferred embodiment illustrated in diagrammatic form in FIG. 3, the transmitter portion and the IF stages in the receiver channel have been omitted for purposes of clarity inasmuch as these components remain unmodified and furthermore are, in actuality, beyond the scope of the present invention.

Figure 4:
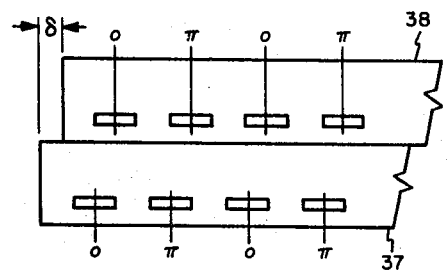
FIG. 4 is a sketch of the preferred form of antenna used in the present invention.

Antenna assembly 10 only generally indicated in FIG. 3 has been replaced by a pair of identical linear rectangular waveguides in co-planar relation as shown, for example, in FIG. 4. Each waveguide may be precisely of the type represented in FIG. 2. Via appropriate well-known microwave circuit elements or devices (not shown) only waveguide 37 is adapted to transmit beams 11 and 12 (FIG. 1) whereas both waveguides 37 and 38 are adapted to receive the backscattered return energy corresponding to beams 11 and 12.

The waveguides are relatively displaced or offset in the direction of their longitudinal axes by a distance $\delta$ so that during reception the phase of the standing wave of energy produced in one waveguide lags the phase of the standing wave produced in the other by $$\pi/4 \text{ radians} \quad (7)$$

in terms of the relevant guide wavelength. In other words, the receiving antenna of FIG. 1 is effectively duplicated by another antenna shifted in space phase along the direction of travel by $\pi/4$ radians. As a result, the antenna array of FIG. 4 will provide two voltages which after final detection will be exactly alike but for a constant quadrature or 90° shift in their respective phases.

This may be mathematically demonstrated as follows. Using voltage expressions, let the output of waveguide 37 during reception be represented by $$e_1 = A \sin [(\omega + \nu_f)t + \phi] + B \sin [(\omega + \nu_a)t + \theta] \quad (8)$$

where $\nu_f$ represents the Doppler frequency shift reflected in the echo corresponding to beam 11 and $\nu_a$ designates the frequency shift in the backscattered return energy associated with beam 12. This Equation 8 represents the summing of the forward and aft echo signals in waveguide 37. Now expanding $e_1$ through the trigonometric identity.

$$\sin(\alpha+\beta) = \sin\alpha\cos\beta + \cos\alpha\sin\beta \quad (9)$$

we get $$e_1 = [A\sin(\omega t)\cos(\nu_f t+\phi) + A\cos(\omega t)\sin(\nu_f t+\phi)] + [B\sin(\omega t)\cos(\nu_a t+\phi) + B\cos(\omega t)\sin(\nu_a t+\theta)] \quad (10)$$

In the system being considered the looking angle of the forward and aft beams are equal; therefore it is a useful assumption to let $A=B$. Equation 10 then reduces to $$e_1 = A\sin\omega t\,[\cos(\nu_f t+\phi)+\cos(\nu_a t+\theta)] + A\cos\omega t\,[\sin(\nu_f t+\phi)+\sin(\nu_a t+\theta)] \quad (11)$$

By using the trigonometric indentities $$\sin\gamma+\sin\beta = 2\sin\tfrac{1}{2}(\alpha+\beta)\cos\tfrac{1}{2}(\alpha-\beta) \quad (12)$$

and $$\cos\alpha+\cos\beta = 2\cos\tfrac{1}{2}(\alpha+\beta)\cos\tfrac{1}{2}(\alpha-\beta) \quad (13)$$

Equation 11 may be transformed to yield $$e_1 = 2A\left\{\sin\omega t\left[\cos\left(\tfrac{\nu_f+\nu_a}{2}t+\tfrac{\phi+\theta}{2}\right)\cos\left(\tfrac{\nu_f-\nu_a}{2}t+\tfrac{\phi-\theta}{2}\right)\right] + \cos\omega t\left[\sin\left(\tfrac{\nu_f+\nu_a}{2}t+\tfrac{\phi+\theta}{2}\right)\cos\left(\tfrac{\nu_f-\nu_a}{2}t+\tfrac{\phi-\theta}{2}\right)\right]\right\} \quad (14)$$

Factoring out the $$\cos\left(\tfrac{\nu_f-\nu_a}{2}+\tfrac{\phi-\theta}{2}\right)$$

term and utilizing the trigonometric identity for the sine of the sum of two angles we get $$e_1 = 2A\cos\left(\tfrac{\nu_f-\nu_a}{2}t+\tfrac{\phi-\theta}{2}\right)\left\{\sin\left(\omega t+\tfrac{\nu_f+\nu_a}{2}t+\tfrac{\phi+\theta}{2}\right)\right\} \quad (15)$$

In straight and level flight, it can be assumed that $$\nu_f = -\nu_a = \nu$$

therefore Equation 15 reduces to $$e_1 = 2A\cos\left(\nu t+\tfrac{\phi-\theta}{2}\right)\sin\left(\omega t+\tfrac{\phi+\theta}{2}\right) \quad (16)$$

which is, essentially, the mathematical statement of a carrier at an angular frequency $\omega$ being amplitude modulated by an envelope having a frequency $\nu/2\pi$.

Recalling that waveguide 38 (FIG. 4) is space phased relative to waveguide 37 by $\pi/4$ radians, the voltage expression for the signal obtained from the former may be expressed as $$e_2 = A\sin\left[\omega+\nu_f t+\phi+\tfrac{\pi}{4}\right] + B\sin\left[\omega+\nu_a t+\theta-\tfrac{\pi}{4}\right] \quad (17)$$

Expanding through use of trigonometric identity (9) and letting $A=B$ yields $$e_2 = A\sin\omega t\left[\cos\left(\nu_f t+\phi+\tfrac{\pi}{4}\right)+\cos\left(\nu_a t+\theta-\tfrac{\pi}{4}\right)\right] + A\cos\omega t\left[\sin\left(\nu_f t+\phi+\tfrac{\pi}{4}\right)+\sin\left(\nu_a t+\theta-\tfrac{\pi}{4}\right)\right] \quad (18)$$

which through further use of trigonometric identities (12), (13) may be expanded to $$e_2 = 2A\left\{\sin\omega t\left[\cos\left(\tfrac{\nu_f+\nu_a}{2}+\tfrac{\phi+\theta}{2}\right)\cos\left(\tfrac{\nu_f-\nu_a}{2}t+\tfrac{\phi-\theta}{2}+\tfrac{\pi}{4}\right)\right] + \cos\omega t\left[\sin\left(\tfrac{\nu_f+\nu_a}{2}t+\tfrac{\phi+\theta}{2}\right)\cos\left(\tfrac{\nu_f-\nu_a}{2}t+\tfrac{\phi-\theta}{1}+\tfrac{\pi}{4}\right)\right]\right\} \quad (19)$$

Factoring out the $$\cos\left(\tfrac{\nu_f-\nu_a}{2}+\tfrac{\phi-\theta}{2}+\tfrac{\pi}{4}\right)$$

term, Equation 19 may be restated as $$e_2 = 2A\cos\left[\tfrac{\nu_f-\nu_a}{2}t+\tfrac{\phi-\theta}{2}+\tfrac{\pi}{4}\right]\left\{\sin\omega t\cos\left(\tfrac{\nu_f+\nu_a}{2}+\tfrac{\phi+\theta}{2}\right) + \cos\omega t\sin\left(\tfrac{\nu_f+\nu_a}{2}t+\tfrac{\phi+\theta}{2}\right)\right\} \quad (20)$$

which, it can easily be shown, reduces to $$e_2 = 2A\cos\left(\tfrac{\nu_f-\nu_a}{2}+\tfrac{\phi-\theta}{2}+\tfrac{\pi}{4}\right)\sin\left(\omega t+\tfrac{\nu_f+\nu_a}{2}t+\tfrac{\phi+\theta}{2}\right) \quad (21)$$

Again letting $\nu_f = -\nu_a = \nu$, Equation 21 then becomes $$e_2 = 2A\cos\left(\nu t+\tfrac{\phi-\theta}{2}+\tfrac{\pi}{4}\right)\sin\left(\omega t+\tfrac{\phi+\theta}{2}\right) \quad (22)$$

Of course, it will be noted that Equation 22 is similar to Equation 16 but for the $\pi/4$ phase shift in its modulation envelope or cosine term.

With reference again to FIG. 3, the output voltages $e_1$, $e_2$ from each waveguide section in antenna assembly 10' are simultaneously applied to detectors 34, 35 respectively as indicated. Assuming each detector comprises, for example, a conventional square law device, the output of detector 34 may be written in the form $$e_1' = [e_1\ (\text{Equation 15})]_2 = 4A^2\cos^2\left(\tfrac{\nu_f-\nu_a}{2}t+\tfrac{\phi-\theta}{2}\right)\sin^2\left(\omega t+\tfrac{\nu_f+\nu_a}{2}t+\tfrac{\phi+\theta}{2}\right) \quad (23)$$

which by substitution of the following trigonometric identities $$\cos^2\alpha = \tfrac{1+\cos 2\alpha}{2} \quad (24)$$

and $$\sin^2\alpha = \tfrac{1-\cos 2\alpha}{2} \quad (25)$$

may be restated as $$e_1'(=4A^2[\tfrac{1}{2}+\tfrac{1}{2}\cos(\nu_f-\nu_a)t+\phi-\theta]$$
$$[\tfrac{1}{2}-\tfrac{1}{2}\cos(2\omega t+\nu_f+\nu_a)t+\phi+\theta] \quad (26)$$

The last term in Equation 26 is at twice the carrier frequency and will be filtered out by the detector circuit leaving $$e_1' = 4A^2\{\tfrac{1}{2}+\tfrac{1}{2}\cos[\nu_f-\nu_a)t+\phi-\theta] \quad (27)$$

The left hand term inside the brackets represents a D.C. component and the cosine term the demodulated Doppler information.

Similarly, the output signal of detector 35 may be expressed as $$e_2' = [e_2 \text{ (Equation 21)}]^2 = 4A^2 \cos^2\left(\frac{\nu_f - \nu_a}{2}t + \frac{\phi - \theta}{2} + \frac{\pi}{4}\right) \sin^2\left(\omega t + \frac{\nu_f + \nu_a}{2}t + \frac{\phi^2 + \theta}{2}\right) \quad (28)$$

which, in turn, may be expanded through trigonometric identies (24), (25) to yield $$e_2' = 4A^2\left[\frac{1}{2} + \frac{1}{2}\cos(\nu_f - \nu_a)t + \phi - \theta + \frac{\pi}{2}\right](\frac{1}{2} - \frac{1}{2}\cos(2\omega t + \nu_f + \nu_a)t + \phi + \theta] \quad (29)$$

Removing the right hand term by suitable filter means leaves $$e_2' = 4A^2\left\{\frac{1}{2} + \frac{1}{2}\cos\left[(\nu_f - \nu_a)t + \phi - \theta + \frac{\pi}{2}\right]\right\} \quad (30)$$

where the cosine term again represents the extracted modulation envelope or Doppler information. Rewriting the cosine term in Equation 30 we get $$e_2' = 4A^2 \frac{1}{2} - \frac{1}{2}\sin(\nu_f - \nu_a)t + \phi - \theta \quad (31)$$

In Equations 27 and 31 the D.C. components may be filtered out and the envelope terms rewritten in simplified form to yield $$e_1' = \cos(\nu_f - \nu_a)t \quad (32)$$

$$e_2' = \sin(\nu_f - \nu_a)t \quad (33)$$

with the last two expressions clearly indicating that a quadrature phase relation exists between the respective detector outputs.

Summarizing up to this point, a modified antenna is utilized to produce a pair of microwave Doppler frequency signals differing in phase by $\pi/4$ radians. These signals are then simultaneously but separately detected to yield a pair of voltages having a frequency content equal to $(\nu_f - \nu_a)$ and a relative phase shift of 90°.

Now when motion is forward the phase rotation sense defined by this pair of voltages is related to the sign of the quantity $(\nu_f - \nu_a)$ and may be assumed to rotate in the positive direction. However, when motion is reversed, the sign of the $\sin(\nu_f - \nu_a)t$ term reverses while the $\cos(\nu_f - \nu_a)t$ does not, hence the phase rotation sense of the voltage pair reverses, rotating in the negative direction. Thus, to an extent, the velocity sense information may be said to be contained in the pair of voltages identified by Equations 32, 33. Nonetheless, it is necessary to further process this quadrature signal pair before the aforesaid information may be extracted in usable form. This is done in the following manner.

Referring once more to FIG. 3, the outputs from the two detectors are applied simultaneously to respective multipliers 40, 41 as shown. Also being fed into each multiplier is a constant frequency offset reference signal obtained from a common source, namely, generator 42 which latter may comprise, for example, a conventional crystal controlled oscillator. The exact frequency value of this offset reference signal is not critical, however it is preferably chosen to be several times greater than the highest Doppler shift frequency to be processed by the system. Since, as indicated only the offset reference frequency input signal corresponding to multiplier 40 is passed through 90° phase shifter 43, the reference signal input to multiplier 40 may be designated by the expression $$\cos \rho t \quad (34)$$

and the reference signal input applied to multiplier 41 may be identified by the expression $$\sin \rho t \quad (35)$$

where $\rho$ is equal to the reference frequency in radians/second.

Representing the output voltage or product of multiplier 40 as $$e_3 = \cos \rho t \cos(\nu_f - \nu_a)t \quad (36)$$

and the output voltage or product of multiplier 41 as $$e_4 = \sin \rho t \sin(\nu_f - \nu_a)t \quad (37)$$

and using trigonometric identities, we get $$e_3 = \frac{1}{2}\{\cos[\rho + (\nu_f - \nu_a)t] + [\rho - (\nu_f - \nu_a t)]\} \quad (38)$$

and $$e_4 = \frac{1}{2}\{-\cos[\rho + (\nu_f - \nu_a)t] + \cos[\rho - (\nu_f - \nu_a)t]\} \quad (39)$$

Now, when two multiplier output voltages are applied to the differential unit 44, as shown in FIG. 3, an output signal is produced $$e_5 = e_3 - e_4 \quad (40)$$

which upon substitution of Equations 38, 39 becomes $$e_5 = \cos[\rho + (\nu_f - \nu_a)t] \quad (41)$$

Considering the case where the Doppler system is, for example, mounted aboard a helicopter vectoring forwardly in the direction of ground track the Doppler shift $\nu_f$ corresponding to forward beam 11 is upward or positive and the shift $\nu_a$ associated with rearwardly directed beam 12 is downward or negative. Therefore the quantity $(\nu_f - \nu_a)$ is positive and equal in magnitude to $|\nu_f - \nu_a|$ and the frequency of the voltage appearing at the output of differential unit 44 will be equal to the sum of the offset reference frequency *plus* a frequency term representing twice the magnitude of the Doppler shift in each beam as indicated by Equation 41.

On the other hand, consider circumstances when motion is reversed and the helicopter is vectoring backwards. In this case, $\nu_f$ is negative and $\nu_a$ is positive. As a consequence, the quantity $(\nu_f - \nu_a)$ becomes negative although still equal in magnitude to $|\nu_f + \nu_a|$; that is $$[(-\nu_f) - (+\nu_a)] = [-\nu_f - \nu_a] = -|\nu_f + \nu_a| \quad (42)$$

Now from trigonometry we know that $\sin(-\alpha) = -\sin \alpha$, and that $\cos(-\alpha) = \cos(\alpha)$. Hence as mentioned previously, the sign of the sine term in Equation 33 changes and the latter becomes $$e_1' = -\sin(\nu_f - \nu_a)t \quad (43)$$

while Equation 32 remains unaffected. Therefore, when Equation 43 is now substituted into Equations 37 and 39 the voltage expression for the output of differential 44 becomes $$e_5 = \cos[\rho - (\nu_f - \nu_a)t] \quad (44)$$

which is to say that when the helicopter is vectoring backwards the frequency of voltage $e_5$ will be equal to the *difference* between the offset reference frequency and a frequency representing twice the magnitude of the Doppler shift in each beam (assuming as it was straight and level flight).

It is now apparent that the signal output of the differential unit 44 comprises enough data for determining both velocity magnitude and sense. However, owing to the fact that the Doppler frequency term $(\nu_f - \nu_a)$ contained in this signal comprises a relatively broad spectrum of frequencies rather than a single frequency, this data is still in raw form and must be processed even further. Accordingly, the output voltage of the receiver (i.e., differential 44) together with the pure offset reference frequency signal separately obtained from generator 42 are fed into a frequency tracker represented schematically in FIG. 3 by block 45.

As is well-known in the art, the function of the frequency tracker is to accurately and continuously determine the mean frequency of the input Doppler spectrum, smoothing instantaneous frequency variations and to produce as a usable output a square wave representing the digital analog of velocity.

Basically, the frequency tracker loop is a frequency discriminator in which an error signal is produced by comparing the output frequency of a variable local oscillator with the demodulated Doppler spectrum obtained from the receiver. The comparison is accomplished by mixing the Doppler spectrum with the local oscillator frequency and utilizing the resultant error signal to control the local oscillator until the latter produces a frequency equal to the center frequency of the spectrum. The error signal will then be nulled and the oscillator frequency will remain at the controlled value. When the spectrum center frequency changes, an error signal proportional to the frequency difference will reappear, and will tend to position the local oscillator to the new center frequency of the spectrum. The oscillator frequency is thus the analog of the mean frequency of the Doppler spectrum.

Figure 5:
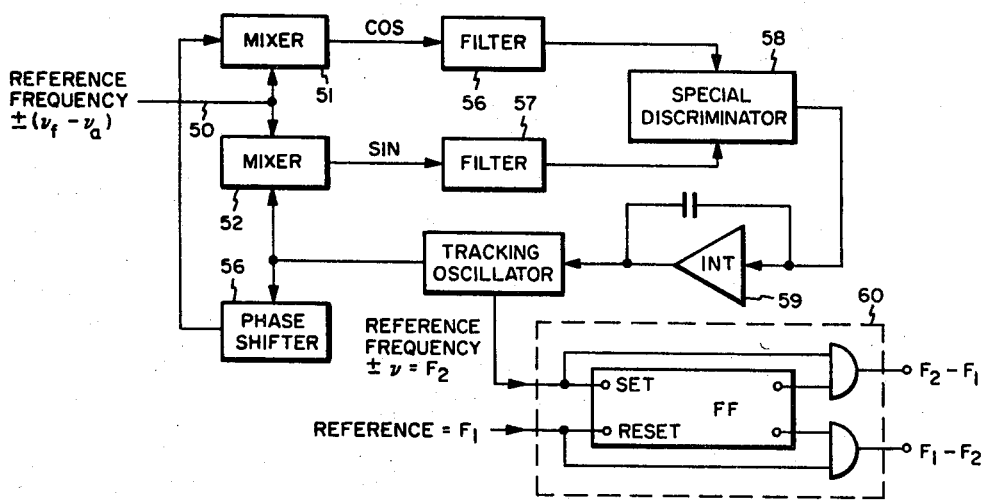
FIG. 5 is a schematic block diagram of the preferred form of frequency tracker used in the present invention.

The frequency tracker preferred for use with the present invention is of the so-called SINE-COSINE type and is shown in schematic block form in FIG. 5. Since this frequency tracker is fully disclosed in Patent #3,121,202, assigned to the assignee of the instant case, and its structural details form no part of the present invention, it will suffice to supply only a functional description of the same.

The receiver output voltage, $e_5$, after passing through an appropriate narrow band filter (not shown) that excludes all frequencies except those in the narrow band surrounding the offset reference frequency is applied along conductor 50 to separate balanced mixers 51, 52. A voltage controlled oscillator 55 (hereinafter referred to as the local oscillator) feeds each mixer with a signal having a frequency nominally close to the frequency of the signal on input line 50. However, before the LO signal enters mixer 51 it is passed through 90° phase shifter 56 as indicated. In consequence, the outputs of each mixer are always phased locked 90° apart. The mixer outputs comprising both sum and difference terms of the LO and input spectrum frequencies are then passed through low-pass filters 56, 57 which remove all extraneous frequencies and pass only the difference frequencies. The filter outputs are then applied to a special discriminator wherein they are multiplied together and a D.C. error voltage is extracted proportional to the difference frequency.

The fact that the frequencies in each channel are phase shifted by 90° enables the discriminator to give the proper sense and polarity to this error voltage. For example, let the frequencies in one channel be represented as $\sin(\omega_x - \omega_{LO})t$ and the frequencies in the other channel as $\cos(\omega_x - \omega_{LO})t$; where $\omega_x$ is the center of the input spectrum and $\omega_{LO}$ is the local oscillator frequency. For $\omega_x \approx \omega_{LO}$, the sine function changes polarity as $\omega_x$ varies slightly above and below $\omega_{LO}$, while the cosine function does not. Hence, the special discriminator will produce a positive D.C. error voltage if the LO frequency is higher than the input center frequency and a negative D.C. voltage if the LO frequency is lower than the input center frequency. The error voltage is then fed to an integrator 59 whose output is utilized to control the frequency of the voltage controlled oscillator 55 which latter has an increasing frequency characteristic for an increasing voltage input. Since an integrator having as its input the above mentioned error voltage will tend to change its output in a positive sense for a negative input (and in a negative sense for a positive input), a negative error voltage at the discriminator output will correct the LO frequency by changing its frequency in an increasing direction until a null is reached and the LO frequency corresponds exactly to the mean frequency of the tracker input spectrum.

Thus, the output of local oscillator 55 will comprise a square wave having a precisely controlled frequency content equal to $\rho \pm \nu$; where $\rho$ is equal to the offset reference frequency and $\nu$ represents the center frequency of the Doppler input spectrum ($\nu_f - \nu_a$). Recalling that $\rho + \nu$ represents a forward velocity and $\rho - \nu$ is proportional to rearward velocity, the local oscillator voltage is then fed to a subtracting circuit represented generally by reference character 60. An additional input in the form of the offset reference frequency is also fed into the subtractor.

This subtractor essentially comprising a single flip-flop stage is set by the LO signal input and reset by the reference frequency input as shown and functions to take the difference between these two frequencies with due regard for sign. That is, when the two flip-flop outputs are combined with samples of the two inputs in a pair of AND circuits as schematically indicated in FIG. 5, the subtractor output consisting of $F_1 - F_2$ on the one hand and $F_2 - F_1$ on the other will be obtained. Now if $F_1$ is assumed to be the reference frequency and $F_2$ the local oscillator output, then $F_1 - F_2$ represents negative velocity (rearward) in pulse form while $F_2 - F_1$ represents positive velocity (forward) also in pulse form. The information is now in usable form and may be directly displayed or utilized in a navigational computer.

It will immediately occur to those skilled in the art, that although a specific antenna configuration was described above in connection with deriving the first pair of signals differing in space phase by $\pi/4$ radians, other and different antenna arrangements may be used to accomplish these same results.

Figure 6:
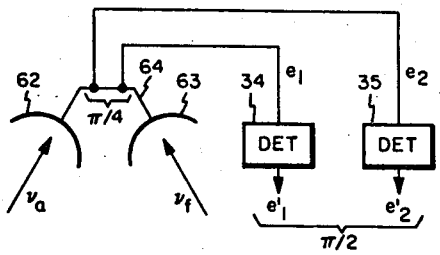
FIGS. 6 and 7 are sketches of alternate embodiments of the antenna used in accordance with the invention.
Figure 7:
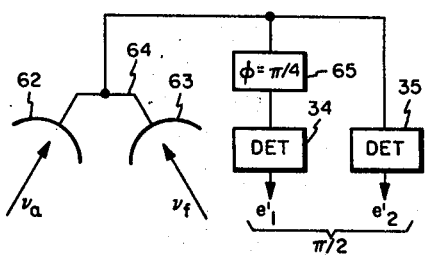

For example, as schematically indicated in FIG. 6, the receiving antennas may comprise in lieu of linear waveguide arrays, a pair of parabolic reflecting dish units 62, 63 joined by a common cable 64 having two output junctions physically separated by $\pi/4$ radians in terms of the wavelength in the cable. Instead of the parabolic antennas, microwave lens antennas may also be used. Or, as indicated in FIG. 7, the cable 64 may have a single junction feeding a branch, one leg of which includes a microwave phase shifter 65 for introducing the $\pi/4$ phase shift before final detection. Such phase shifters are well-known in the art, reference being made to the text "Introduction to RADAR Systems" by M. I. Skolnik, McGraw-Hill 1962, pages 307–312, for a detailed description of same.

In any event, it will be appreciated that the inventive concept presented hereinabove does not depend upon a particular antenna configuration. Known antennas may be utilized as long as means are provided in conjunction therewith to obtain two signals which are related as though there had been two receiving systems mutually displaced along the line of travel by a distance equal to $\pi/4$ radians in phase.

Thus, although preferred embodiments of the invention have been described in considerable detail for purposes of illustration, many additional modifications will occur to the routineer. Therefore, it is desired that the invention be limited only by the true scope of the appended claims.

What is claimed is:

1. In an airborne pulsed non-coherent Janus radar system employing at least one forwardly directed beam and one rearwardly directed beam relative to ground track, the combination comprising;

antenna means for simultaneously receiving the echoes corresponding to each of said beams to produce a first signal comprising substantially the sum of the Doppler shift frequencies included in each of said echoes, means associated with said antenna means for producing a second signal exactly alike said first signal but phase shifted therefrom by $\pi/4$ radians, first and second detector means responsive to said first and second signals respectively for producing a pair of spectral Doppler shift frequency signals in constant phase quadrature with each other, and means responsive to said quadrature phase signal pair for producing a third signal equal to a preselected reference frequency plus said spectral Doppler shift frequency when motion is in the forward direction relative to said ground track and a fourth signal equal to said reference frequency minus said spectral Doppler shift frequency signal when motion is the rearward direction relative to said ground track.

2. The system of claim 1 further comprising frequency tracker means operatively coupled to said last mentioned means for producing on one output line a pulse train having a frequency equal to the mean frequency of said spectral Doppler shift frequency corresponding to said third signal, and on another output line a pulse train having a frequency equal to the mean frequency of said spectral Doppler shift frequency corresponding to said fourth signal.

3. Airborne Doppler radar apparatus, comprising;
transmitter channel means for generating a pulsed microwave carrier,
antenna means responsive to said transmitter channel means for radiating said pulsed microwave carrier toward the ground in the form of a beam directed forwardly with respect to said antenna means and a beam directed rearwardly with respect to said antenna means,
said antenna means being adapted to receive and mix together the echoes resulting from each of said beams to produce a first output characterized by said microwave carrier being modulated by a signal envelope equal to $(\nu_f + \nu_a)$ where $\nu_f$ represents the Doppler shift frequency of the forward beam echo and $\nu_a$ represents the Doppler shift frequency of the rearward beam echo,
said antenna means further including means for producing a second output identical to said first output but differing therefrom in phase by $\pi/4$ radians,
receiver channel means responsive to said antenna means for demodulating said first and second outputs to produce a pair of quadrature phase related signals having a spectral frequency content substantially centered at $(\nu_f - \nu_a)$,
said receiver channel means further including means responsive to said quadrature phase pair of signals for producing a signal having a frequency equal to $\rho + (\nu_f - \nu_a)$ when the velocity of said forward beam and $\rho - (\nu_f - \nu_a)$ when the velocity of said antenna means is in the direction of said rearward beam, where $\rho$ is equal to a preselected constant reference frequency.

4. The apparatus of claim 3, wherein said last mentioned means comprises;
a reference frequency generator having two outputs in quadrature phase relation with one another,
a pair of multipliers each one of which is responsive simultaneously to one of said reference frequency generator outputs and one of said demodulated quadrature phase related signals, and
differential means for subtracting the product of one multiplier from the product of the other multiplier.

5. The apparatus of claim 3, further comprising;
frequency tracker means responsive to the signal produced by said last mentioned means for deriving a square wave having a frequency equal to $\rho \pm (\nu_f - \nu_a)$, said frequency tracker including a subtracting circuit having two inputs and two outputs, one of said inputs comprising said square wave having a frequency equal to $\rho \pm (\nu_f - \nu_a)$ and the other of said inputs comprising said reference frequency $\rho$ whereby one output is equal to $\rho - [\rho - (\nu_f - \nu_a)]$ and the other output is equal to $[\rho + (\nu_f - \nu_a)] - \rho$.

6. The apparatus of claim 3, wherein said antenna means comprises;
a first linear waveguide having a longitudinal series of radiators for coupling said microwave carrier to and from free space, and
said means for producing a second output differing in phase by $\pi/4$ radians comprises a second linear waveguide identical to said first mentioned waveguide but longitudinally displaced in space therefrom.

7. In an airborne non-coherent pulsed Janus radar system including means for transmitting at least one microwave beam in the direction of ground track and at least one microwave beam in the opposite direction, and further including antenna means for receiving and mixing together the echoes resulting from each of said beams, the method of extracting velocity sense and magnitude from said echoes, comprising the steps of;
deriving a first electrical manifestation from said antenna means substantially having a frequency content equal to the sum of the Doppler shift frequencies in each of said beams,
deriving a second electrical manifestation from said antenna means having a frequency content identical to said first electrical manifestation but shifted in phase therefrom by $\pi/4$ radians, and
simultaneously detecting said first and second electrical manifestations to produce a pair of quadrature phase electrical signals having a mean frequency equal to the beat frequency between said Doppler shift frequencies in each of said beams, whereby the rotation sense of the phase vector defined by said quadrature phase signal pair is in one direction when motion of said radar system is in the direction of ground track and said rotation sense is in the opposite direction when motion of said radar system is in the opposite direction relative to ground track.

8. The method of claim 7 further comprising the steps of;
separately multiplying each signal in said quadrature phase pair with a respective signal in an additional signal pair each of which latter have an identical constant preselected frequency value, said additional signals being in quadrature as respects one another, and
subtracting the product resulting from one multiplication from the product resulting from the other multiplication, whereby the resulting difference frequency is equal to the sum of said preselected frequency and said mean frequency when motion of said radar system is the direction of ground track and is equal to the difference between said preselected frequency and said mean frequency when motion of said radar system is the opposite direction relative to ground track.

No references cited.

RODNEY D. BENNETT, *Primary Examiner.*

C. L. WHITHAM, *Assistant Examiner.*